United States Patent
Robertson, III

(10) Patent No.: US 6,687,270 B1
(45) Date of Patent: Feb. 3, 2004

(54) DIGITAL ELECTRONIC SYNCHRONIZATION OF ULTRAFAST LASERS

(75) Inventor: Wyndham Robertson, III, Fremont, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 10/219,012

(22) Filed: Aug. 14, 2002

(51) Int. Cl.$^7$ .............................. H01S 3/13; H01S 3/10; H01S 3/098
(52) U.S. Cl. .............................. 372/30; 372/18; 372/25; 372/29.011; 372/29.015; 372/29.02; 372/29.023; 372/32
(58) Field of Search ........................ 372/18, 25, 29.011, 372/29.015, 29.02, 29.022, 29.023, 30, 32, 38.1

(56) References Cited

U.S. PATENT DOCUMENTS

| | | | |
|---|---|---|---|
| 4,896,324 A | * 1/1990 | Ball et al. ..................... | 372/18 |
| 5,367,529 A | 11/1994 | Holsinger et al. ............. | 372/30 |
| 5,778,016 A | * 7/1998 | Sucha et al. ................. | 372/38.1 |
| 5,926,492 A | 7/1999 | Yoshida et al. ................ | 372/6 |

* cited by examiner

Primary Examiner—Paul Ip
Assistant Examiner—James Menefee
(74) Attorney, Agent, or Firm—Stallman & Pollock LLP

(57) ABSTRACT

In a method and apparatus for synchronizing the output of two passively modelocked pulsed lasers, the output of each laser is sampled and delivered to two photodiodes, one for each laser. The output of the each photodiode is converted to a train of digital pulses having the pulse repetition frequency of each laser. The digital pulses are processed in a digital phase detector that generates from the digital pulses a first analog voltage representative of the phase difference at the photodiodes between corresponding pulses in each train. This analog voltage is summed with a second analog voltage representative of a desired phase relationship of the laser pulses at a target location remote from the photodiodes. The sum of the analog voltages provides an error signal that commands a device to adjust the length of the resonator of one of the lasers. When the error signal is minimized, pulses from each laser have the same repetition frequency and have the desired phase relationship at the target.

19 Claims, 4 Drawing Sheets

DIGITAL ELECTRONIC SYNCHRONIZATION OF ULTRAFAST LASERS

TECHNICAL FIELD OF THE INVENTION

The present invention relates generally to synchronizing the output of modelocked lasers. The invention relates in particular to a method and apparatus for delivering two passively modelocked laser pulse trains from two lasers to a target such that each laser pulse train has the same pulse repetition frequency, and laser pulses in each laser pulse train arrive at the target in a predetermined phase relationship with each other.

DISCUSSION OF BACKGROUND ART

Synchronizing two passively modelocked lasers has been an active research area for many years, because of the needs of applications in which two independently tunable short pulse sources are used to irradiate a target with laser pulses of different wavelengths. Passively modelocked lasers can deliver very short pulses at relatively high pulse repetition rates. By way of example, pulses may have a duration of 10 picoseconds (ps) or less at pulse repetition rates between about 75 about 100 Megahertz (MHz). The pulse duration of a passively modelocked laser is determined, inter alia, by the gain-medium in the resonator and the method of passive modelocking. The pulse repetition rate of a passively modelocked laser is determined by the optical length of the resonator of the laser. Accordingly, the pulse repetition rate can be subject to drift or jitter resulting from changes in the thermal or mechanical environment of the laser.

In many applications in which two independently tunable short pulse sources are used to irradiate a target with two laser pulse trains of different wavelengths, it is required that each laser pulse train has the same pulse repetition frequency, and that laser pulses in each laser pulse train arrive at the target in a predetermined phase relationship with each other. Matching the frequency of two passively modelocked lasers exactly is an extremely difficult task in itself. By way of example, many ultrafast lasers have a resonator length of about one meter (1.0 m). In such a laser a change in resonator length of only 1.0 micrometer ($\mu$m) would cause a frequency change of about 100 Hertz (Hz). Considering that aluminum is a preferred material for optical benches and frames, and that the expansion coefficient of aluminum is on the order of $20 \times 10^{-6}$ per degree Kelvin, the difficulty in achieving exact synchronization can be appreciated. Further, lasing in a passively modelocked laser is initiated, i.e., the first pulse in a train is generated, by a random event. Accordingly, even if two lasers were perfectly synchronized in frequency, the phase relationship of pulse trains delivered by the lasers could be expected to be different each time the lasers were turned on.

Prior art synchronizing methods rely on comparing high harmonics of the laser outputs, for example up to about the $140^{th}$ harmonic of the fundamental (pulse repetition) frequencies of the two lasers, i.e., about 14 Gigahertz (GHz). Accordingly, these methods require high-speed light detection and complex high speed RF phase detector circuitry of high sensitivity for its implementation.

U.S. Pat. No. 5,367,529 discloses a method and apparatus for synchronizing passively modelocked lasers to a jitter of less than 1.0 ps. This method also relies on comparing high harmonics of the fundamental frequencies of the lasers. The harmonic frequencies, however, are heterodyned against the output of a local oscillator having a comparable frequency to reduce the actual frequencies that are compared.

There is clearly a need for a synchronizing method for passively modelocked lasers that does not rely on comparing high harmonic frequencies. Preferably, the method should be capable of being implemented using digital logic electronic components.

SUMMARY OF THE INVENTION

The present invention is directed to a method of synchronizing the output of two lasers, each delivering a passively modelocked laser pulse train to a target, such that each laser pulse train has the same pulse repetition frequency and the laser pulse trains have a predetermined phase relationship at the target. The lasers may be considered as a master laser and a slave laser with the slave laser being synchronized with the master laser. The slave laser is provided with one or more devices for adjusting the resonator length thereof.

In one aspect, the method comprises directing a portion of one of the laser pulse trains onto a first photodetector and a portion of the other laser pulse train onto a second photodetector. The output of the photodetectors resulting from receipt of the pulse trains is digitized to generate first and second digital electronic pulse trains, one corresponding to each of the laser pulse trains. Each electronic pulse train has the same pulse repetition frequency as the laser pulse train to which it corresponds, and pulses in the electronic pulse trains have the same phase relationship as the phase relationship of corresponding pulses in the laser pulse trains at the photodetectors.

Third and fourth electronic pulse trains are generated from the first and second digital electronic pulse trains, pulses in the third electronic pulse train having different duration from corresponding pulses in the fourth electronic pulse train if the phase of the corresponding pulses is different. First and second analog voltage signals are generated from the third and fourth electronic pulse trains, respectively. The amplitude of each analog voltage signal is proportional to the duration of the pulses in the respective train. The first analog voltage signal is subtracted from the second analog voltage signal, thereby generating a third analog voltage signal. The third analog voltage corresponds to the phase difference between corresponding pulses in the laser pulse trains at the photodetectors. A fourth analog voltage is added to the third analog voltage to provide a fifth analog voltage. The fourth analog voltage is representative of the predetermined phase difference of laser pulse trains at the target. One or more of the one or more resonator-length-adjusting devices is operated responsive to the fifth analog voltage to adjust the length of the slave-laser resonator until the fifth analog voltage is minimized. When the fifth analog voltage has been minimized by the resonator-length adjustment, the laser pulse trains have the same frequency and have the predetermined phase relationship at the target.

In a preferred embodiment of the inventive method, the third and fourth electronic pulse trains are generated using two flip-flop circuits (flip-flops) cooperative with a logic AND-gate. The output ports of the flip-flops are connected to the AND-gate. The output port of the AND-gate is connected to the reset ports of each flip-flop.

Beginning with each flip-flop in a low logic state, a pulse in the first electronic pulse trains triggers one of the flip-flops to a logic high state, and a pulse in the second of the electronic pulse trains triggers the other flip-flop to a high logic state. When both flip-flops are in the high logic state, the AND-gate is asserted and the flip-flops are reset to the low logic state. Because of this, the first flip-flop to be triggered remains at the high state until the other is triggered. The last flip-flop to be triggered remains at the high logic state only as long as it takes the AND-gate to reset it to the lowlogic state along with the first to be triggered.

The third and fourth electronic pulse trains are delivered from the output ports of the flip-flops. One of the pulse trains will include pulses having a duration T+k where T is a variable duration corresponding to the difference in arrival time between the triggering pulses at the flip-flops, and k is a fixed duration determined by gate (switching) delays. The other signal will include pulses having only the duration k of the gate delays.

The first and second analog voltage signals are generated from the third and fourth electronic pulse trains by passing each through a low-pass filter that averages the pulse voltages over a pulse train period. The first and second analog voltage signals are then processed as described above.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
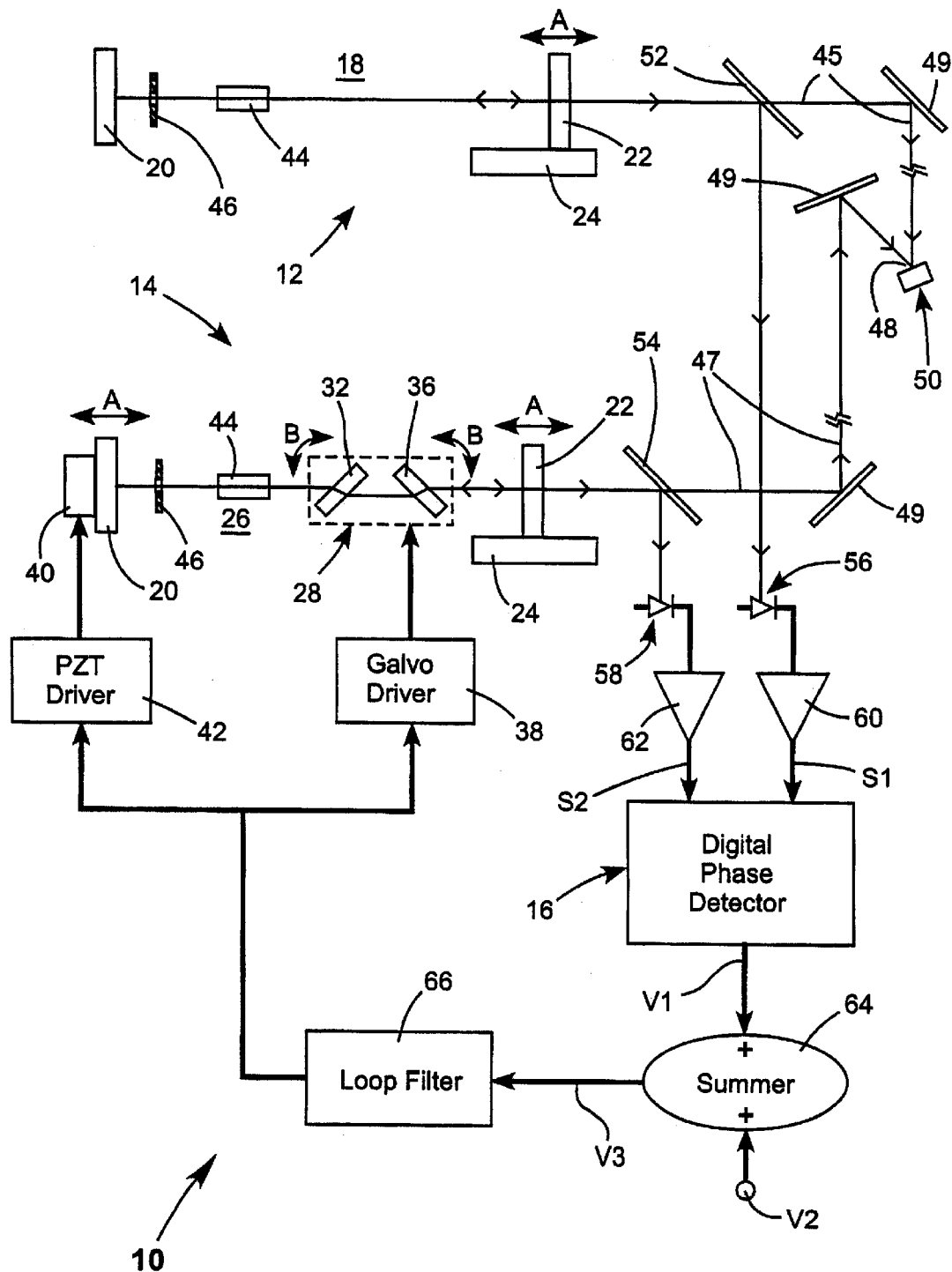
FIG. 1 schematically illustrates a preferred embodiment of apparatus for implementing the method of the present invention including two lasers and a digital phase detector and associated electronic circuits for synchronizing the output of the lasers.
Figure 2:
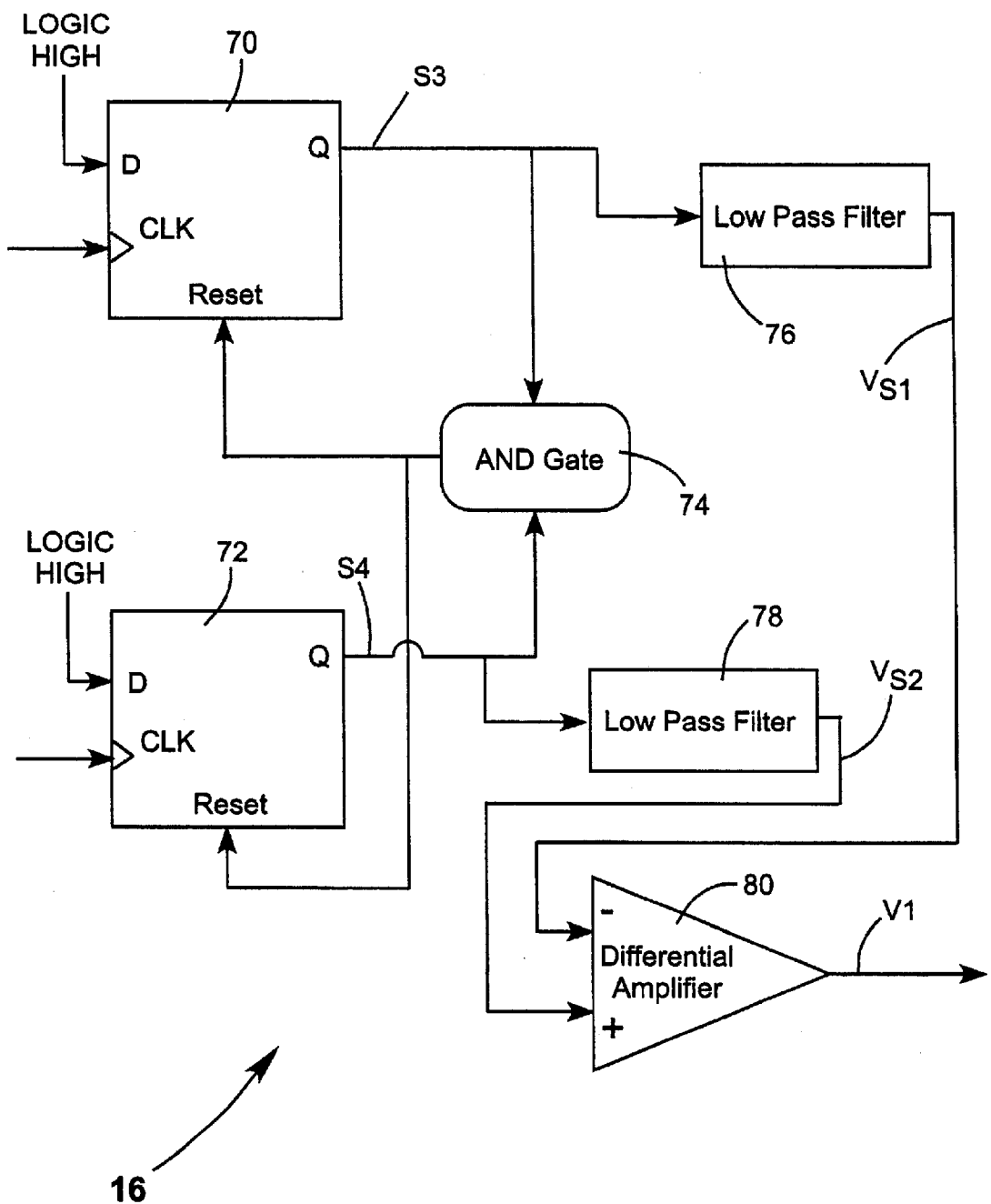
FIG. 2 schematically illustrates electronic circuits and their interconnection in the digital phase detector of FIG. 1, including two flip-flop circuit elements arranged to be triggered to a high logic state on receipt of a electronic pulse corresponding to a laser pulse and a logic AND gate arranged to reset both flip-flop circuits to a low logic state after each has received an electronic pulse corresponding to a laser pulse.

Turning now to the drawings, wherein like features are designated by like reference numerals, FIG. 1 schematically illustrates a preferred apparatus 10 for implementing the method of the present invention. Apparatus 10 includes two lasers 12 and 14, and a digital phase detector 16 and associated electronic circuits for synchronizing the output of the lasers. In FIG. 1, the paths of laser pulses in and from the lasers are designated by fine lines, and the direction of propagation of the laser pulses is indicated by open arrows. Connections between electronic circuits are indicated in FIG. 1 by bold lines, with the direction of signal transfer between the circuits indicated by solid arrows.

Laser 12 may be referred to as the master laser and includes a resonator 18 terminated by a maximally reflecting mirror 20 and a partially transmitting (outcoupling) mirror 22. Mirror 22 is mounted on a translation stage that allows mirror 24 to be moved axially, as indicated by arrows A, for providing coarse adjustment of the optical length of the resonator, and, accordingly, coarse adjustment of the repetition-frequency of laser pulses delivered from the resonator.

Laser 14 may be referred to as the slave laser and includes a resonator 26 terminated by a maximally reflecting mirror 20 and a partially transmitting (outcoupling) mirror 22. Mirror 22 of laser 14 is also mounted on a translation stage that allows mirror 24 to be moved axially for providing coarse adjustment of the resonator length. The optical length of resonator 26 is arranged to be automatically adjusted by digital phase detector 16 and associated electronic circuits and devices for synchronizing output pulse trains delivered by laser 14 with output pulse trains delivered by laser 12.

Two devices are provided for implementing automatic adjustment of the length of resonator 26. A first of these is a galvanometer arrangement 28 including two transparent plates 32 and 36 that are rotatable as indicated by arrows B. The mirrors are rotated toward or away from each other for respectively increasing or decreasing the resonator length. The rotational position is determined by a galvanometer driver circuit 38. Galvanometer 28 provides for medium range adjustment of the resonator length (and pulse-repetition frequency). The second length resonator-length-adjustment device is a piezoelectric transducer (PZT) 40 which positions mirror 20 of resonator 26 axially as indicated by arrows A. The axial position mirror 20 is determined by the magnitude of a voltage applied to the PZT by a driver circuit 42. PZT 40 provides for rapid-response, fine adjustment of the optical length of resonator 26. Resonators 18 and 26 each include a gain-medium 44 and an aperture 46 that works cooperatively with a Kerr effect in gain-medium 44 to provide passive modelocking of the resonators.

It should be noted here that lasers 12 and 14 are depicted for simplicity of illustration, with straight resonators in a very basic form. Those skilled in the art will recognize that ultrafast lasers often have complex folded resonators and include tuning elements and elements for controlling group delay dispersion (GDD) such as prisms. A detailed discussion of such features is not necessary for understanding principles of the present invention. Accordingly such features are not described or depicted herein.

Galvanometer 28 is arranged for particular use in a straight resonator. Those skilled in that art will recognize that other galvanometer arrangements may be used in straight or folded resonators without departing from the spirit and scope of the present invention.

Output pulse trains from lasers 12 and 14 are delivered along paths 45 and 47 to impinge at a location 48 on a target 50. Paths 45 and 47 may be of different optical length and include optical components such as turning mirrors 49. As discussed above, it is desired that pulses traveling along each path arrive on target 50 with the same repetition frequency and in a predetermined phase relationship with each other. In many applications it is desirable that pulses from each path arrive, simultaneously, or at least within a time period less than the temporal width of the pulses.

Mirrors 22 of laser resonators 18 and 26 can be manually adjusted such that lasers 12 and 14 have pulse repetition frequencies matched to within about 1.0%. Such an adjustment can be monitored by a pulse counter arrangement or the like (not shown). This adjustment brings the repetition frequency difference of lasers 12 and 14 within a range that can be more precisely corrected by galvanometer device 28. Galvanometer device 28 automatically reduces the repetition frequency difference to within a range that can be automatically corrected by PZT-driven mirror 20 of resonator 26. A preferred method of automatically effecting these corrections (frequency and phase synchronization or matching) is set forth below with continuing with reference to FIG. 1.

A portion of pulse trains from lasers 12 and 14 is sampled by beamsplitter mirrors 52 and 54 respectively. The sampled portions are directed to photodetectors (here photodiodes) 56 and 58 respectively. The output of photodiodes 56 and 58 is communicated to digital receivers 60 and 62 respectively. Digital receivers 60 and 62 deliver a pulse at a predetermined peak logic voltage level for each electronic pulse received from the photodiodes independent of the magnitude of the received pulses. Accordingly, digital receivers 60 and 62 deliver digital signals (trains of electronic pulses all having the same peak voltage) S1 and S2 to digital phase detector 16. Signals S1 and S2 have the same repetition frequency as the pulse-repetition frequency of laser pulse trains arriving at photodiodes 56 and 58 respectively.

Digital phase detector 16 is arranged to generate an analog voltage signal V1 from digital signals S1 and S2 using circuitry described in detail further hereinbelow. Analog voltage V1 is representative of the phase difference between signals S1 and S2 and will be essentially zero when signals S1 and S2 have the same repetition frequency and are in phase. It will be evident to one skilled in the art that, because of the above discussed frequency jitter, the length of resonator 26 will usually be in a constant state of correction. Accordingly, voltage V1 may only instantaneously be exactly zero and, when synchronization has been effected to a limiting accuracy of the inventive method and apparatus, may vary randomly with time slightly above and below zero. In this state, signal voltage V1 can be referred to as being minimized, i.e., jittering about zero.

It should be noted here that when voltage V1 is zero, this indicates that sampled pulse trains are arriving in phase, at the same frequency at photo diodes 56 and 58. Corresponding pulse trains arriving at target 50 will have the same frequency but may be out of phase, having followed different paths of different length to the target. In order to provide that pulses have the desired phase relationship at the target, voltage V1 is summed with a voltage V2 in a summer circuit 64 to provide an analog voltage signal V3. Voltage V2 is selected such that V3 is minimized when pulse trains from laser 12 and 14 arrive on target 50 with the same repetition frequency and have the desired phase relationship with each other. In this condition, of course, sample pulse trains arriving at photodetectors 58 and 56 may not be in phase, and voltage V1, correspondingly, may not be zero. Selection of V2 can be made by observing the arrival of pulses at the target location, for example, using a phase detection arrangement similar to that described herein or by observing a phenomenon resulting from interaction of pulses with the target.

Voltage signal V3 provides an error signal representative of a difference in frequency or desired phase. The signal is electronically filtered in a filter 66 to eliminate any high harmonic content. The filtered signal is communicated to PZT driver 42 and galvanometer driver 38. The error signal, of course, will be zero if V3 is zero. As long as V3 is not zero, galvanometer 28 or PZT 40 will adjust the length of resonator 26 to synchronize the arrival of pulses at target 50. Depending on whether V3 is positive or negative, the resonator length will be increased or decreased.

It should be noted here that PZT 40 has a response time about 500 times faster than that of galvanometer 28. If PZT 40 reaches one or the other extreme of its range and V3 is not zero, as may happen in an initial stage of synchronization, the PZT will wait at this extreme until galvanometer 28 has adjusted the resonator length sufficiently to drive V3 to zero. Galvanometer 28 has a higher gain than PZT 40 and will tend to dominate the correction process at slow speeds leaving PZT 40 at about the midpoint of its movement range. If, subsequently, a length adjustment necessary to drive V3 to zero is within the range of PZT 40, as will typically be the case once initial synchronization has been achieved, PZT 40 will effect the length adjustment before galvanometer 28 can effectively respond.

As discussed above, an important aspect of the present invention is the generation of an analog voltage signal V1 from digital signals S1 and S2 having the pulse repetition frequency pulse trains delivered by lasers 12 and 14 respectively. Voltage V1 is zero if signals S1 and S2 have the same pulse repetition frequency and are in phase at photodiodes 56 and 58. V1 has some other positive or negative value if signals S1 and S2 have different frequencies, or have the same frequency but are out of phase at the photodiodes. A preferred circuit layout and method of operation for digital phase detector 16 is discussed below with reference to FIG. 2 and FIGS. 3A–D.

Digital phase detector 16 includes two flip-flop circuit elements (flip-flops) 70 and 72. Each flip-flop has a logic voltage (LOGIC HI) applied to a port D thereof Signals S1 and S2 are delivered to the clock port (CLK) of flip-flops 70 and 72 respectively. In the following discussion, signal S1 and signals generated therefrom are occasionally referred to as master signals. Signal S2 and signals generated therefrom are referred to as slave signals.

In the example depicted by timing diagrams of FIGS. 3–D it is assumed that master and slave signals S1 and S2 have different frequencies, and slave signal S2 is leading in phase. A pulse of signal S2 triggers flip-flop 72 causing the output at port Q of the flip-flop to go to a high logic state. At a time (Ts) after flip-flop 72 has been triggered, a corresponding pulse in signal S1 triggers the output of flip-flop 70 to a high logic state. The terminology "corresponding pulses" in this description and the appended claims means a pulse in one pulse train that immediately precedes or succeeds in time a pulse in the other pulse train.

The outputs of flip-flops 70 and 72 are both connected to a logic AND-gate 74. When the output of both flip-flops is at a high logic state, the output of AND-gate 74 is asserted and the output of both flip-flops is reset to a low logic state after some minimal delay period (Td) due to response time of the logic gates. Accordingly, the output (S3) of the flip-flop 70 has a pulse width Td equal to the gate (switching) delays, whereas the output (S4) of flip-flop 72 has a pulse width Ts+Td equal to the sum of the lead-time of the slave pulse and the gate delays. Ts is variable with phase and TD is a constant dependent on the particular electronic circuits used.

Signals S3 and S4 are averaged over the period of the signal by low-pass filters 76 and 78, respectively, to provide analog voltages $V_{S1}$ and $VS_{S2}$, respectively. The period of each signal is equal to the inverse of the frequency of the signal (T=1/f). The duty-cycle is equal to the pulse width times the frequency. The amplitude of the analog voltage delivered by each low-pass filter, accordingly, is equal to the duty-cycle times the logic peak-to-peak voltage ($V_{logic}$) plus any offset voltage ($V_{offset}$) due to emitter-coupled logic (ECL) logic levels. Stated more generally, the amplitude of the analog voltages are proportional to the duration of the pulses in the respective trains. Voltages $V_{S1}$, and $VS_{S2}$ can be defined mathematically as indicated in equations (1) and (2) below.

$$V_{S1}=V_{logic}*fS1*(Ts+Td)+V_{offset} \quad (1)$$

$$V_{S2}=V_{logic}*fS2*Td+V_{offset} \quad (2)$$

Voltages $V_{S1}$ and $V_{S2}$ are subtracted in a differential amplifier 80, the output of which is voltage V1 discussed above with reference to FIG. 1.

Figure 3A:
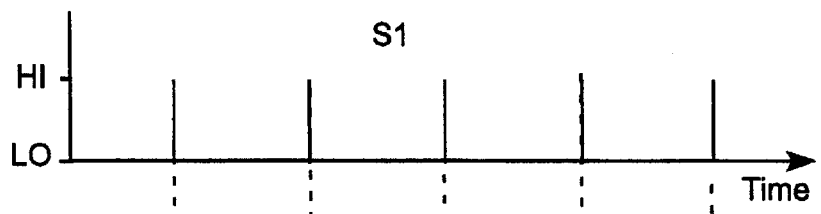
FIGS. 3A–D are timing diagrams indicating the form of output pulse trains from the flip-flop circuits of FIG. 2 in response to the flip-flop circuits receiving electronic pulse trains of different frequency.
Figure 3B:
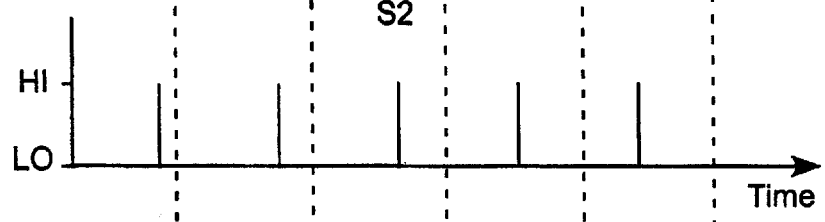
Figure 3C:
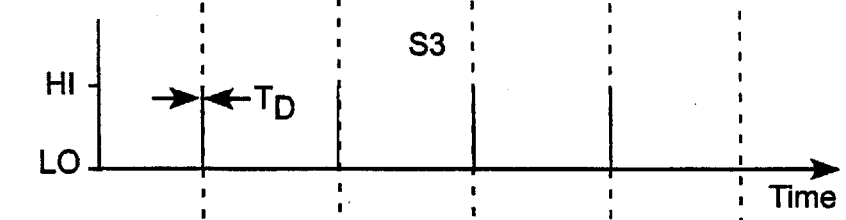
Figure 3D:
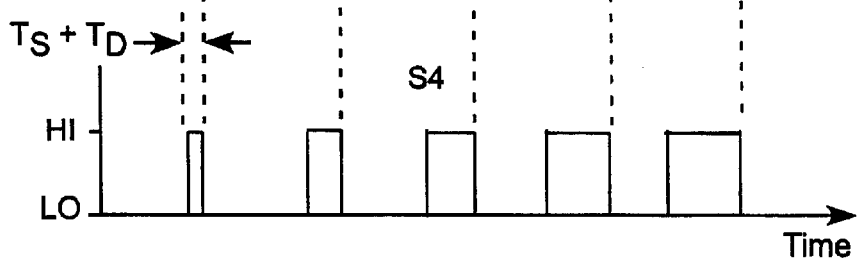
Figure 4A:
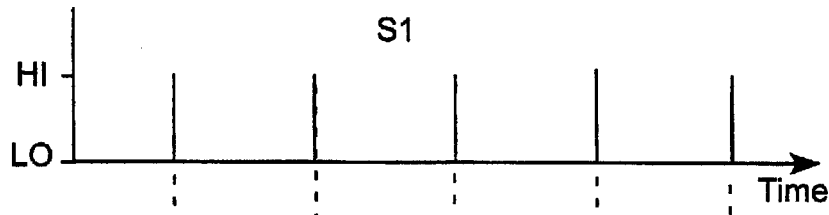
FIGS. 4A–D are timing diagrams indicating the form of output pulse trains from the flip-flop circuits of FIG. 2 in response to the flip-flop circuits receiving electronic pulse trains of the same frequency but different phase.
Figure 4B:
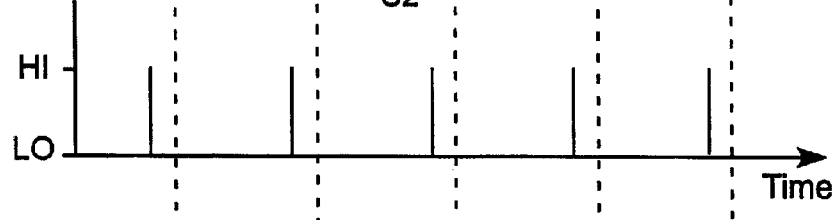
Figure 4C:
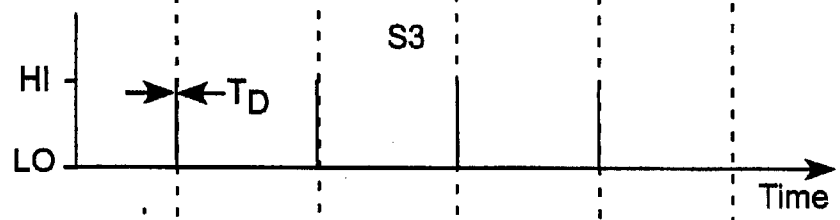
Figure 4D:
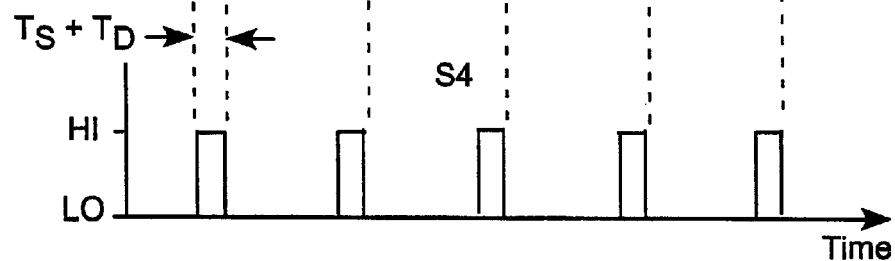

It should be noted here that in the case when signals S1 and S2 (and correspondingly S3 and S4) have different frequencies, the value of $T_s$ will vary with time and may vary periodically from zero and an entire period. In FIG. 3D this variation is greatly exaggerated for purposes of illustration.

FIGS. 4A–D are timing diagrams illustrating a case where signals S1 and S2 have the same frequency but are out of phase. Here, $T_S$ does not vary with time and V1 can be defined by an equation:

$$V1=V_{logic}*f*Ts*G \quad (3)$$

where G is the gain of differential amplifier 80, and f is the common frequency of signals S1 and S2. Equation (3) is a reasonable approximation in most practical instances of phase difference between the master and slave signals.

The phase difference (phase), in degrees, is equal to the frequency times the slave lag or lead time (Ts) divided by 360. Accordingly equation (3) can be rewritten as follows.

$$V1=(Phase*V_{logic}*G)/360 \quad (4)$$

As the differential amplifier gain G and logic voltage $V_{logic}$ are set by design, the output V1 of digital phase detector 16 can be considered to be a variable representative only of the relative phase at photodiodes 56 and 58 of pulse trains emitted by lasers 12 and 14. A phase difference at any instant can be the result of a frequency difference, or a phase difference only. If the slave signal lags the master in phase, voltage S3 will be bigger than voltage S4. Accordingly the sign (positive or negative) of V3 can be used to determine whether the length of resonator 26 should be increased by galvanometer 28 or PZT 40.

In one preferred mode of operation of apparatus 10, lasers 12 and 14 are first closely matched in frequency, for example, to within about 1%, by manual adjustment of resonator mirror 22 in one or both of the lasers. Voltage V2 is set to zero, thereby making V3 equal to V1, and automatic synchronization in accordance with the present invention (minimizing V3, here, also minimizing V1) is implemented to equalize the frequency of pulse trains from the lasers and bring them in phase at photodiodes 56 and 58. V2 is then varied and V3 minimized by the inventive automatic resonator length adjustment until the pulse trains have the desired phase relationship on target 50.

V2 can be set initially at some arbitrary value other than zero, and the frequency of the pulse trains matched without regard to their phase relationship. V2 may then be varied and V3 minimized until the desired phase relationship of the pulse trains at the target is established. If V2 has been predetermined, it can be set before automatic frequency matching is initiated, and the desired frequency relationship will be established when V3 is minimized by the inventive automatic matching.

All of the timing information of the laser signal is contained in the rising edge, at the 50% power point. Higher harmonics of the fundamental repetition frequency of the lasers determine the shape or rise-time of the rising-edge of laser pulses. Using digital circuits preserves as much of this information as possible without a need to isolate and compare any particular harmonic frequencies, provided that that the rise-time of the logic circuits is faster than the rise-time of the photodiode output. The potential accuracy of the inventive method for controlling the phase relationship of pulses on a target depends, inter alia, on the voltage resolution available in applying V2. Because of this, it is recommended that separate coarse and fine adjustment be provided for voltage V2. By way of example, if the voltage is adjusted potentiometrically, it recommended that coarse and fine adjustment potentiometers be provided. If voltage adjustment is made digitally, it is recommended that coarse and fine digital-to-analog converters (DACs) be provided.

The present invention is described and depicted herein in terms of a preferred and other embodiments. The invention, however, is not limited to the embodiments described and depicted. Rather, the invention is limited only by the claims appended hereto.

What is claimed is:

1. A method of synchronizing the output of first and second lasers and delivering respectively first and second passively modelocked laser pulse trains from the lasers such that each laser pulse train has the same pulse repetition frequency and the pulse trains have a predetermined phase relationship at a target, the first and second lasers including respectively first and second laser resonators at least one of which includes one or more resonator-length adjusting devices, the method comprising the steps of:

directing a portion of the first and second laser pulse trains onto respectively first and second photodetectors;

digitizing the output of said photodetectors to provide first and second digital electronic pulse trains corresponding respectively to the first and second laser pulse trains, said first digital electronic pulse train having the same pulse repetition frequency as the first laser pulse train, said second digital electronic pulse train having the same pulse repetition frequency as the second laser pulse train, and pulses in said first and second digital electronic pulse trains having the same phase relationship as the phase relationship of corresponding pulses in said first and second laser pulse train portions at said photodetectors;

generating third and fourth electronic pulse trains from said first and second digital electronic pulse trains, pulses in said third electronic pulse train having different duration from corresponding pulses in said fourth electronic pulse train when the phase of said corresponding pulses is different;

generating from said third electronic and fourth electronic pulse trains respectively first and second analog voltage signals, said analog voltage signals being proportional to the duration of the corresponding electronic pulses in the pulse train;

subtracting said first analog voltage signal from second analog voltage signal, thereby generating a third analog voltage signal, said third analog voltage being proportional to the phase difference between corresponding pulses in said laser pulse trains at said photodetectors;

adding a fourth analog voltage signal to said third analog voltage signal to generate a fifth analog voltage signal, said fourth analog voltage signal corresponding to the predetermined phase relationship of the laser pulse trains at the target; and operating one or more of said one or more resonator-length-adjusting devices responsive to said fifth analog voltage until said fifth analog voltage signal is minimized.

2. The method of claim 1, wherein said third analog voltage is zero when said laser pulse train portions have the same frequency and are in phase at said photodetectors.

3. The method of claim 2, wherein said fifth analog voltage is zero when said laser pulse trains have the same frequency and have the predetermined phase relationship at the target.

4. The method of claim 1, wherein said second laser resonator is terminated by first and second mirrors and includes a first and second of said resonator-length-adjusting devices operable in response to said fifth analog voltage, said first resonator-length-adjusting device being located in the resonator between said first and second mirrors, and said second resonator-length-adjusting device being arranged to adjust the length of said second resonator by moving said first mirror axially with respect to said second mirror.

5. The method of claim 4, wherein said first resonator-length-adjusting device is a galvanometer device including rotatable transparent plates.

6. The method of claim 4, wherein said second resonator-length-adjusting device is a piezoelectric transducer.

7. The method of claim 1, wherein said generation of said third and fourth electronic pulse trains includes providing first and second flip-flop circuits cooperative with a logic AND-gate, triggering said first flip-flop circuit to a high logic state with a pulse in said first electronic pulse train, triggering said second flip-flop circuit to a high logic state with a pulse in said second electronic pulse train, connecting said flip-flop circuits to said AND-gate such that when both flip-flops are in said high logic state, said AND-gate is asserted and said flip-flop circuits are reset to a low logic state, the first of said flip-flop circuits to be triggered thereby remaining at said high state until the other thereof is triggered, said third and fourth electronic pulse trains being delivered from output ports of said flip-flop circuits with a pulse in one thereof having a duration longer than a corresponding pulse in the other thereof if there is a phase difference between the triggering pulses, both of said corresponding pulses having the same duration if there is no phase difference between the triggering pulses.

8. The method of claim 7, wherein said longer-duration pulse has a duration T+k and the other has a duration k, where T is a variable duration corresponding to the difference in arrival time between the triggering pulses at said flip-flop circuits, and k is a fixed duration determined by switching response times.

9. The method of claim 7, wherein said first and second analog voltage signals are generated by passing said third and fourth electronic pulse signals through respectively first and second low-pass filter circuits.

10. The method of claim 1, wherein said first and second analog voltage signals are generated by passing said third and fourth electronic pulse signals through respectively first and second low-pass filter circuits.

11. A method of synchronizing the output of first and second lasers and delivering respectively first and second passively modelocked laser pulse trains from the lasers such that each laser pulse train has the same pulse repetition frequency and the pulse trains have a predetermined phase relationship at a target, the first and second lasers including respectively first and second laser resonators at least one of which includes one or more resonator-length adjusting devices, the method comprising the steps of:

directing a portion of the first and second laser pulse trains onto respectively first and second photodetectors;

digitizing the output of said photodetectors to provide first and second digital electronic pulse trains corresponding respectively to the first and second laser pulse trains, said first digital electronic pulse train having the same pulse repetition frequency as the first laser pulse train, said second digital electronic pulse train having the same pulse repetition frequency as the second laser pulse train, and pulses in said first and second digital electronic pulse trains having the same phase relationship as the phase relationship of corresponding pulses in said first and second laser pulse train portions at said photodetectors;

providing first and second flip-flop circuits cooperative with a logic AND-gate;

triggering said first flip-flop circuit to a high logic state with a pulse in said first electronic pulse train;

triggering said second flip-flop circuit to a high logic state with a pulse in said second electronic pulse train;

connecting said flip-flop circuits to said AND-gate such that when both flip-flops are in said high logic state, said AND-gate is asserted and said flip-flop circuits are reset to a low logic state, the first of said flip-flop circuits to be triggered thereby remaining at said high state until the other thereof is triggered, thereby delivering third and fourth electronic pulse trains from an output port of respectively said first and second flip-flop circuits with a pulse in one thereof having a duration longer than a corresponding pulse in the other thereof if there is a phase difference between the triggering pulses, both of said corresponding pulses having the same duration if there is no phase difference between the triggering pulses;

generating from said third electronic and fourth electronic pulse trains respectively first and second analog voltage signals, said analog voltage signals being proportional to the duration of the corresponding electronic pulses in the pulse train;

subtracting said first analog voltage signal from second analog voltage signal, thereby generating a third analog voltage signal, said third analog voltage being proportional to the phase difference between corresponding pulses in said laser pulse trains at said photodetectors;

adding a fourth analog voltage signal to said third analog voltage signal to generate a fifth analog voltage signal, said fourth analog voltage signal corresponding to the predetermined phase relationship of the laser pulse trains at the target; and operating one or more of said one or more resonator-length-adjusting devices responsive to said fifth analog voltage until said fifth analog voltage signal is minimized.

12. The method of claim 11, wherein said third analog voltage is zero when said laser pulse train portions have the same frequency and are in phase at said photodetectors.

13. The method of claim 12, wherein said fifth analog voltage is zero when said laser pulse trains have the same frequency and have the predetermined phase relationship at the target.

14. The method of claim 11, wherein said second laser resonator is terminated by first and second mirrors and includes a first and second of said resonator-length-adjusting devices operable in response to said fifth analog voltage, said first resonator-length-adjusting device being located in the resonator between said first and second mirrors, and said second resonator-length-adjusting device being arranged to adjust the length of said second resonator by moving said first mirror axially with respect to said second mirror.

15. The method of claim 14, wherein said first resonator-length-adjusting device is a galvanometer device including rotatable transparent plates.

16. The method of claim 14, wherein said second resonator-length-adjusting device is a piezoelectric transducer.

17. The method of claim 11, wherein said first and second analog voltage signals are generated by passing said third and fourth electronic pulse signals through respectively first and second low-pass filter circuits.

18. A method of synchronizing the output of first and second lasers and delivering respectively first and second passively modelocked laser pulse trains from the lasers such that each laser pulse train has the same pulse repetition frequency and the pulse trains have a predetermined phase relationship at a target, the first and second lasers including respectively first and second laser resonators at least one of which includes one or more resonator-length adjusting devices, the method comprising the steps of:

(a) directing a portion of the first and second laser pulse trains onto respectively first and second photodetectors;

(b) digitizing the output of said photodetectors to provide first and second digital electronic pulse trains corresponding respectively to the first and second laser pulse trains, said first digital electronic pulse train having the same pulse repetition frequency as the first laser pulse train, said second digital electronic pulse train having the same pulse repetition frequency as the second laser pulse train, and pulses in said first and second digital electronic pulse trains having the same phase relationship as the phase relationship of corresponding pulses in said first and second laser pulse train portions at said photodetectors;

(c) generating third and fourth electronic pulse trains from said first and second digital electronic pulse trains, pulses in said third electronic pulse train having different duration from corresponding pulses said fourth electronic pulse train when the phase of said corresponding pulses is different;

(d) generating from said third electronic and fourth electronic pulse trains respectively first and second analog voltage signals, said analog voltage signals being proportional to the duration of the corresponding electronic pulses in the pulse train;

(e) subtracting said first analog voltage signal from second analog voltage signal, thereby generating a third analog voltage signal, said third analog voltage being proportional to the phase difference between corresponding pulses in said laser pulse trains at said photodetectors;

(f) operating one or more of said one or more resonator-length-adjusting devices responsive to said third analog voltage until said third analog voltage is minimized, whereby said laser pulse train portions have the same frequency and are in phase at said photodetectors;

(g) following step (f) adding a fourth analog voltage signal to said third analog voltage signal to generate a fifth analog voltage signal, said fourth analog voltage signal corresponding to the predetermined phase relationship of the laser pulse trains at the target; and (h) operating one or more of said one or more resonator-length-adjusting devices responsive to said fifth analog voltage until said fifth analog voltage is minimized, whereby the laser pulse trains have the same frequency and have the predetermined phase relationship at the target.

19. A method of synchronizing the output of first and second lasers and delivering respectively first and second passively modelocked laser pulse trains from the lasers such that each laser pulse train has the same pulse repetition frequency and the pulse trains have a predetermined phase relationship at a target, the first and second lasers including respectively first and second laser resonators at least one of which includes one or more resonator-length adjusting devices, the method comprising the steps of:

(a) directing a portion of the first and second laser pulse trains onto respectively first and second photodetectors;

(b) digitizing the output of said photodetectors to provide first and second digital electronic pulse trains corresponding respectively to the first and second laser pulse trains, said first digital electronic pulse train having the same pulse repetition frequency as the first laser pulse train, said second digital electronic pulse train having the same pulse repetition frequency as the second laser pulse train, and pulses in said first and second digital electronic pulse trains having the same phase relationship as the phase relationship of corresponding pulses in said first and second laser pulse train portions at said photodetectors;

(c) generating third and fourth electronic pulse trains from said first and second digital electronic pulse trains, pulses in said third electronic pulse train having different duration from corresponding pulses in said fourth electronic pulse train when the phase of said corresponding pulses is different;

(d) generating from said third electronic and fourth electronic pulse trains respectively first and second analog voltage signals, said analog voltage signals being proportional to the duration of the corresponding electronic pulses in the pulse train;

(e) subtracting said first analog voltage signal from second analog voltage signal, thereby generating a third analog voltage signal, said third analog voltage being proportional to the phase difference between corresponding pulses in said laser pulse trains at said photodetectors;

(f) adding a fourth analog voltage signal to said third analog voltage signal to generate a fifth analog voltage signal;

(h) following step (f) operating one or more of said one or more resonator-length-adjusting devices responsive to said fifth analog voltage until said fifth analog voltage signal is minimized, whereby the laser pulse trains have at least the same frequency; and (g) if following step (h) the laser pulse trains do not have the phase relationship at the target, varying said fourth voltage and repeating step (h) until the laser pulse trains have the predetermined phase relationship at the target.

* * * * *